United States Patent [19]

Macpherson

[11] 4,195,382
[45] Apr. 1, 1980

[54] REMOVABLE PLASTIC CONNECTOR

[75] Inventor: Robert B. Macpherson, Merrillville, Ind.

[73] Assignee: The Anderson Company of Indiana, Gary, Ind.

[21] Appl. No.: 950,857

[22] Filed: Oct. 12, 1978

[51] Int. Cl.² .............................................. B60S 1/40
[52] U.S. Cl. .................................................. 15/250.32
[58] Field of Search ....................... 15/250.32, 250.42

[56] References Cited

U.S. PATENT DOCUMENTS 3,874,018  4/1975  Berg et al. .......................... 15/250.32

FOREIGN PATENT DOCUMENTS

| | | | |
|---|---|---|---|
| 1655992 | 7/1971 | Fed. Rep. of Germany ........ | 15/250.32 |
| 2331324 | 1/1974 | Fed. Rep. of Germany ........ | 15/250.32 |
| 2819540 | 11/1978 | Fed. Rep. of Germany ........ | 15/250.32 |
| 2254959 | 7/1975 | France ................................. | 15/250.32 |

*Primary Examiner*—Peter Feldman
*Attorney, Agent, or Firm*—Wegner, Stellman, McCord, Wiles & Wood

[57] ABSTRACT

A connector for connecting one type of windshield wiper arm end to a cross pin-type wiper blade. The arm end is releasably attached to the connector which connector has a body portion with a pin-receiving slot on the forward end thereof. The orientation of the pin-receiving slot with respect to the longitudinal axis of the body portion is such that to assemble the arm to the pin on the blade, the axis of the arm and connector relative to the longitudinal axis of the blade approaches 75° to 90°. The pin-receiving slot is forced over the pin on the blade to seat the pin in the slot. Once the pin on the blade is in the slot in the connector, the arm is pivoted relative to the blade until the axis of the arm is substantially parallel to the axis of the blade. The width of the connector is such as to contact the walls of the opening in the blade to guide the arm relative to the blade and at the same time the body portion of the connector fits into said opening in the blade and has a shoulder to prevent the connector from becoming disengaged from the blade during normal use of the blade.

2 Claims, 5 Drawing Figures

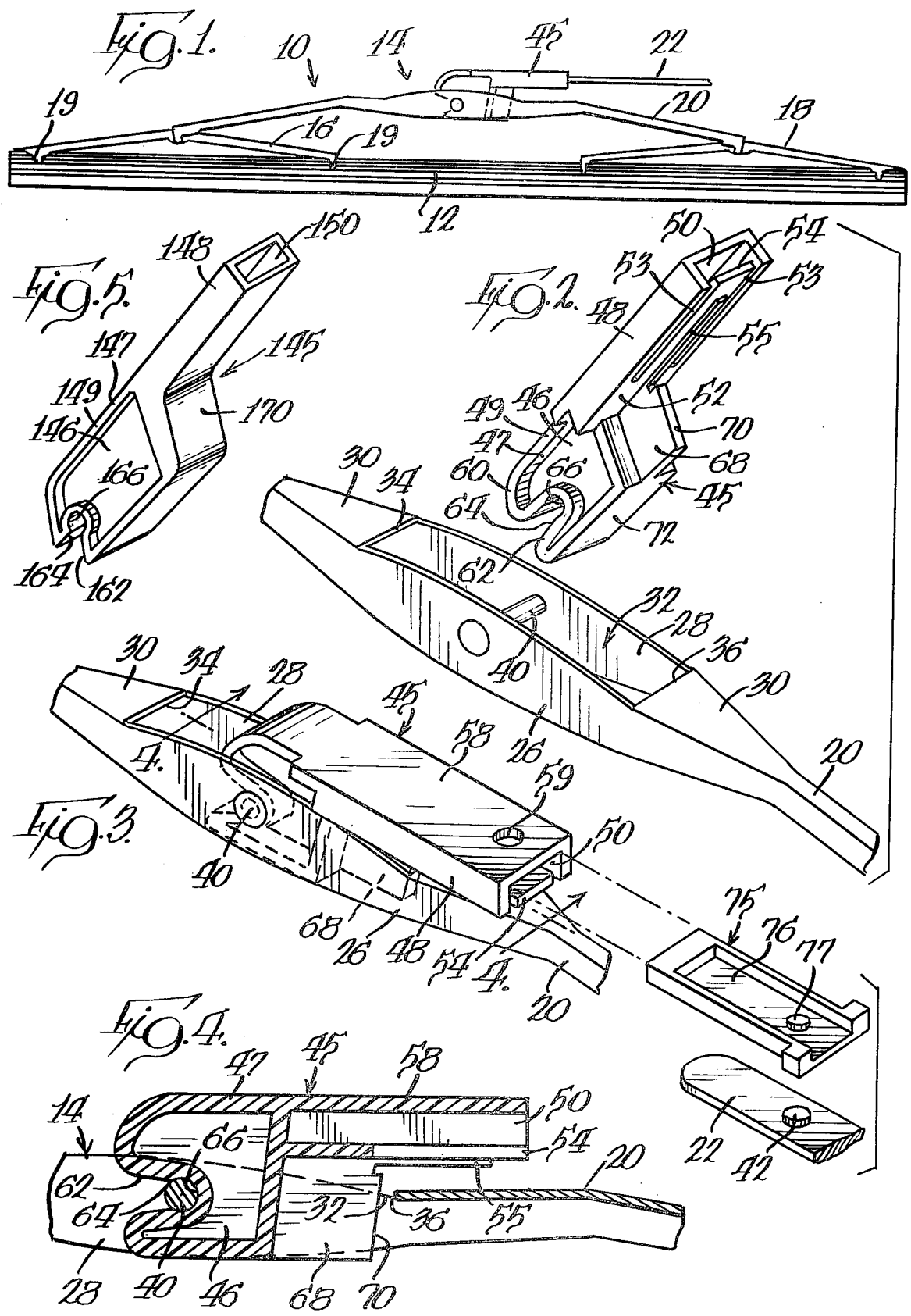

REMOVABLE PLASTIC CONNECTOR

BACKGROUND OF THE INVENTION

1. Field of the Invention

This invention relates to windshield wipers and, more particularly, to a connector for connecting a wiper arm to a blade.

2. Description of the Prior Art

The connection of a windshield wiper arm to a windshield wiper blade has been a problem almost since the automobile was invented. Many of the problems with the connection have to do with changing the styles of the wiper arm and/or wiper blade. One style of wiper arm that has now been accepted for some time is the bayonet or straight end wiper arm. Unfortunately, there are many other arm ends being used that require a particular construction of a wiper blade to be effective. Somewhat of a compromise has been reached whereby a wiper blade has a superstructure with an inverted U-shape, in cross section, bridge with an opening in the back of said bridge. A pin extends from wall to wall across the opening and forms the anchor upon which many different connectors for wiper arms are connected for securing the blade to the arm.

U.S. Pat. No. 3,576,044 to Besnard shows an adaptor which has a reduced width slot and aperture. The pin in the bridge of the blade is flat on opposite sides, such that the flats will align with the reduced width slot in the adaptor as the adaptor is assembled on the pin. The adaptor is then rotated so that the wider part of the pin aligns with the slot and is too big to escape from the slot thereby holding the adaptor on the blade.

French Patent of Addition 73 45226, addition to French Patent No. 2,254,959, shows an adaptor with a slot in the front such that with the adaptor angled to the blade, the slot spreads to admit the pin on the bridge, the adaptor is rotated so that the body of the adaptor is in the opening in the bridge to prevent removal of the adaptor.

U.S. Pat. Nos. 2,056,777 to Evans and 2,046,495 to Whitted show assembling an arm to a blade by assembling a slot in the arm end over a pin or bar on the blade and then pivoting the arm to a position to make it impossible to disconnect the blade from the arm when the arm is in normal operating position on the blade.

SUMMARY OF THE INVENTION

An improved connector is provided for converting certain arm ends, such as a straight arm end, for connection to a wiper blade. The connector overcomes many of the problems existent in the prior art and provides a positive, secure and effective connection for an arm to a blade.

The connector has a body portion with the outer edges of oppositely extending flanges defining the sidewardly extending reaches thereof. A slot with a throat smaller in cross section than the diameter of the pin on the blade opens into an aperture of a size to accept said pin and retain it therein. In one form of the invention, the slot has an axis that is oriented at approximately 45° to the axis of the connector and in another form said axis of the slot is parallel to the axis of the connector. For assembly, the slot in the connector is aligned with the pin with the axis of the connector angled with respect to the axis of the blade. The connector is urged toward the pin until the aperture in the connector receives the pin. The connector is pivoted so that its axis is substantially parallel to the axis of the blade. The body portion extends transverse to the axis of the aperture sufficient to telescope in the opening in the blade, but is large enough to prevent the connector from moving parallel to the axis of the blade a sufficient distance to disengage the connector from the pin. The outer edges of said flanges act as guides on the inside walls of the blade.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a windshield wiper blade having a wiper arm connected thereto using my improved connector;

FIG. 2 is an exploded partial perspective view of my improved connector aligned ready for attachment to the pin on the blade;

FIG. 3 is a perspective view of the connector of FIG. 2 connected to the blade and having an adaptor for a narrow straight end arm exploded therefrom;

FIG. 4 is a cross-sectional view taken along the lines 4—4 of FIG. 3; and

FIG. 5 is a perspective view of a modified form of connector.

DESCRIPTION OF THE PREFERRED EMBODIMENT

In FIG. 1, a windshield wiper blade 10 is shown and is comprised of a flexible backed rubber wiping element 12 to which is connected a superstructure 14. The superstructure 14 has a pair of secondary yokes 16 and 18 connected together by a bridge member 20. The secondary yokes 16 and 18 are connected to the flexible backed rubber wiping element 12 by claws 19 at the respective ends thereof so as to apply pressure evenly from the wiper arm 22 to the wiping lip of the wiping element 12. The bridge 20 is pivotally connected at its ends to the midportions of the secondary yokes 16 and 18 and is formed from sheet metal in the shape of an inverted "U" so as to provide spaced apart parallel side walls 26 and 28 joined by a top wall 30. As shown in FIG. 2, an opening 32 is formed in the back of the U-shaped bridge 20, which opening 32 is defined by the top edges of the side walls 26,28 and by end edges 34 and 36 of the top wall 30. A pin 40 extends between the side walls 26 and 28 substantially at the midportion of said opening 32. The pin 40 is secured to the side walls 26,28 so as to hold the side walls spaced apart in substantially parallel relationship. It is to be understood that the pin 40 need not necessarily be at the midportion of the opening 32 in the bridge 20 as long as there is an opening which has two sides defined by spaced apart side walls across which the pin 40 extends. The wiper arm 22 is driven by a motor on the vehicle and, as illustrated, is a straight end-type wiper arm having an upstanding lug 42 formed near the outer end portion thereof. A connector 45 is provided for receiving the straight end of the wiper arm 22 and is connected to the bridge 20 of the superstructure 14 of the wiper blade 10 such that the wiper blade can be oscillated across the surface of the windshield to clean same.

The connector 45 is a molded plastic part and has a body portion 46 with oppositely directed, outwardly extending flanges 47 formed completely around the outer periphery of said body portion 46 to provide substantially parallel, oppositely facing edges 49. A rectangularly-shaped housing or extension 48 is molded integrally with the body portion 46 and has a rearwardly facing opening 50 therefrom. The bottom wall 52 of the housing 48 has a pair of slits 53 extending from the open end thereof to define a tab 54 which has a rib 55 molded integrally therewith substantially throughout its length. The tab 54 has a resilience that urges the outer end of the tab 54 toward the opening 50 in the housing 48. The top wall 58 of the housing 48 has an opening 59 therethrough which is adapted to receive the lug 42 on the end of the straight end wiper arm 22 for retaining the connector 45 assembled with the arm. To disconnect the wiper arm 22 from the connector 45, the arm is urged in a pivoting manner toward the tab 54 to pivot the tab about its connection to the housing 48 until the lug 42 becomes disengaged from the opening 59 whereupon the arm 22 can be retracted from the connector 45.

The front wall 60 of the connector 45, spaced from the housing 48, has a slot 62 formed therein which diverges toward a narrow throat portion 64 and then opens into an enlarged aperture 66 extending transversely through the body portion 46 of the connector 45. The diameter of the aperture 66 is larger than the width of the throat 64 and substantially coincides with the diameter of the pin 40 on the blade 10. The flanges 47 extend outwardly from the body portion 46 throughout the shape of the slot 62 and aperture 66 so as to define the slot and aperture therewith. A web 68 extends rearwardly from the body portion 46 of the connector 45 and has a rear edge 70 which is spaced from the center of the aperture 66 in the connector 45 by an amount slightly less than the distance from the centerline of the pin 40 to either of the end edges 34 or 36 of the opening 32 in the bridge 20 of the blade 10. The distance between the planes forming the outer edges 49 of the flanges 47 is just slightly less than the distance between the inside of the side walls 26 and 28 of the bridge 20 of the blade 10. The slot 62 in the connector 45 has a longitudinal axis that is substantially parallel to the longitudinal axis of the connector 45. The axis of the aperture 66 in the connector 45 lies transverse to the planes containing the edges 49 of the flanges 47.

The connector 45 is assembled with the bridge 20 of a blade by tilting the connector 45 so that the longitudinal axis of the connector is at an angle with respect to the axis of the blade 10 sufficient to locate the bottom wall 72 of the connector 45 above the top wall 30 of the bridge 20. The slot 62 in the connector 45 is aligned with the pin 40 with the outer edges 49 of the flanges 47 within the opening 32 between the side walls 26 and 28 of the bridge 20. The connector 45 is urged toward the pin 40 so that the throat 64 of the connector 45 engages the pin 40 to spread the walls of the slot 62 until the pin 40 passes through the throat 64 and into the aperture 66 in the connector 45. The throat 64 now closes and forms a retaining means for preventing ready withdrawal of the blade 10 from the connector 45. The outer edges 49 of the flanges 47 slide freely within the side walls 26 and 28 so that as the connector 45 is pivoted about the axis of the pin 40 so as to bring the axis of the connector 45 parallel to the axis of the blade 10, the web 68 of the body portion 46 telescopes in the opening with the rear wall 70 clearing the end edge 36. The longitudinal axis of the connector 45 lies substantially parallel to the longitudinal axis of the blade 10 so that with an arm 22 assembled with the connector 45, the blade would be in its normal operating position for cleaning a windshield. Under extreme conditions of use, the web 68 will contact the edge 36 of the opening 32 to prevent the connector 45 from disconnecting from the blade.

As shown in FIG. 3, and as is well known in the art, there are two widthas of straight end wiper arms. FIG. 3 shows an adaptor 75 for converting a narrow straight end wiper arm 22 to the width of the opening 50 in the housing 48 in the connector 45. The adaptor 75 has a cavity 76 which has a width substantially coinciding with the standard width of the narrow straight end wiper arm 22 so that a straight end wiper arm can be nested in the cavity 76 in said adaptor 75. A lug 77 is provided in the cavity 76 in the adaptor 75 which seats up into an indent or opening in the arm end. The adaptor 75 is then inserted in the opening 50 in the housing 48 of the connector 45 so that the lug 77 on the top of the arm nests in the opening 59 in the top wall 58 of the housing 48 so as to secure the connector 45 to the arm 22.

It will be noted, for instance as best illustrated in FIG. 4, that with the connector 45 connected to the pin 40, the web 68 on the body portion 46 nests inside the opening 32 in the blade 10 and will prevent the connector 45 from escaping from its attachment with the pin 40. The spacing from the center of the pin 40 to the end edge 36 of the opening 32 is just a slight bit larger than the distance from the center of the opening 32 in the connector 45 to the rear edge 70 of the web 68 of the connector 45. In this way, even if the connector 45 could escape from the pin 40 on the blade, the web 68 on the body portion 46 of the connector 45 would engage edge 36 of opening 32 to prevent the connector 45 from disconnecting from the blade.

As the arm 22 and blade 10 are oscillated across the surface of a windshield, the arm 22 and connector 45 will pivot a small amount about the axis of the pin 40. So as to prevent looseness between the connector 45 and the blade 10, the outer edges 49 of the flanges 47 on the body portion 46 fit closely within the side walls 26 and 28 so that said side walls 26 and 28 guide and stabilize the connector 45 with respect to the bridge 20 of the blade 10. In this way, the blade 10 cannot pivot about an axis transverse to the axis of the pin 40 and, therefore, provides a more stable connection and one less likely to encourage chatter of the blade on the windshield.

Another embodiment of the connector 145 of the invention is shown in FIG. 5 wherein the body portion 146 has sidewardly extending flanges 147 around the outer periphery thereof with the edges 149 of the flanges 147 lying in a pair of substantially parallel spaced apart planes. The length of the body portion 146 is longer than the version shown in FIG. 2 so that the rear wall 170 of the body portion 146 is spaced from the center of the aperture 166 in the body portion 146 by an amount slightly less than the distance from the center of the pin 40 to the edge 36 of the opening 32 in the blade. The edges 149 of the flanges 147 around the periphery of the body portion 146 provide an outwardly facing guiding surface on each side of the connector 145 so that said guiding surfaces are spaced apart an amount sufficient to permit the connector to move within the opening 32 between the walls 26 and 28 of the blade. The housing 148 on the body portion 146 is substantially the same as the housing 48 in the version shown in FIG.

2 and is designed to receive the straight end of a straight end wiper arm 22.

In the lower front corner of the connector 145, a slot 162 is angularly formed therein. The axis of the slot 162 forms an angle with the longitudinal axis of the connector 145 of approximately 45°. The slot 162, itself has the same general physical characteristics as the slot 62 in the FIG. 2 version. That is, the mouth of the slot 162 is wide enough to receive a pin 40 therein. The entry to the slot 162 narrows to a throat 164 which has a width less than the diameter of the pin 40. Beyond the throat 164 in the slot 162, an aperture 166 is formed which has a diameter substantially equal to the diameter of the pin 40 and which diameter is larger than the width of the throat 164. The connector 145 of FIG. 5 has the mouth of the slot 162 aligned with the pin 40 and is pushed down on to the pin 40 so as to seat the pin in the aperture 166. The connector 145 is now pivoted about the axis of the pin 40 so that the rear wall 170 of the housing 148 is within the opening 32 in the bridge 20 of the blade 10 with the outer edges 149 of the flanges 147 of the body portion 146 serving to guide the motion of the connector 145 relative to the blade. The spacing between the axis of the aperture 166 in the connector 145 and the rear wall 170 of the connector 145 is slightly less than the distance between the center of the pin 40 and the edge 36 of the opening 32 in the bridge 20. With the connector having the longitudinal axis substantially parallel to the longitudinal axis of the blade, the rear wall 170 of the connector 145 is positioned so as to prevent removal of the connector 145 from the blade 10 during normal use of the blade.

The FIG. 5 version of the invention has the advantage that pressure to assemble the connector 145 to the blade 10 is at a 45° angle to the axis of the connector such that more direct pressure can be applied more readily on the connector for attaching the connector to the blade. Likewise, the direction of force to remove the connector 145 from the blade 10 is at an angle to the normal use of the connector on the blade and, therefore, the likelihood of separating the connector from the blade is diminished. By applying force at a 45° angle to the connector 145, it is clear that the force serves only to connect the connector 145 to the blade 10 and not to force the arm end into the pocket in the housing 148 of the connector 145. The improved construction does not place any undue load on the pin 40 of the blade 10 relative to the opening 32 in the connector and will not accidentally disconnect the arm from the connector while assembling the connector with the blade.

I claim:

1. A connector for connecting a wiper arm to a wiper blade, said wiper arm having an outer end portion releasably attached to said connector, said wiper blade having a bridge member with an opening formed through the back thereof, a cross pin anchored on said bridge in alignment with said opening, said connector having a body portion, a forward part of said body portion having a gradually tapering slot extending inwardly therefrom and terminating in an enlarged circular aperture of a diameter larger than the width of a throat in said tapering slot, oppositely directed flanges extending outwardly from the peripheries of the opposite sides of said body portion, said flanges engage with walls of said opening in said blade to guide said connector during relative movement between the connector and said blade a single web connected to the mid-portion of said body portion and extending rearwardly therefrom, said web having a rear edge spaced from the center of said aperture an amount slightly less than the distance from the center of said pin to the adjacent edge of said opening in the bridge, said single web having a downwardly facing bottom edge coplanar with the bottom wall of the body portion and extending rearwardly an amount substantially equal to the distance from the center of the pin to said rear edge, said bottom edge having a lateral dimension equal to the thickness of said web, whereby said web prevents said connector from being removed from said blade when said blade and wiper arm are in normal operating position.

2. A connector as claimed in claim 1 wherein the slot has an axis which is approximately 45° to the longitudinal axis of the connector.

* * * * *